XR 3,738,487

SEARCH ROOM

United Stat

Way et al.

SUBSTITUTE FOR MISSING XR

[11] 3,738,487

[45] June 12, 1973

[54] RANDOM DOCUMENT LOCATOR

[75] Inventors: Robert W. Way, San Jose; Gilbert F. Clifford, Los Altos Hills; Robert W. Henkel, Cupertino; Arthur W. Odell, Alberton; Donald F. Smith, Palo Alto, all of Calif.

[73] Assignee: Varian Adco, Palo Alto, Calif.

[22] Filed: Nov. 3, 1971

[21] Appl. No.: 195,272

[52] U.S. Cl. .......... 209/80.5, 209/111.7, 250/227, 250/219 DC

[51] Int. Cl. .......... B07c 3/16

[58] Field of Search .......... 209/80.5, 110.5; 250/227, 220 MX, 219 DC, 219 FR, 219 Q, 219 D

[56] References Cited

UNITED STATES PATENTS

| | | | |
|---|---|---|---|
| 3,519,832 | 7/1970 | Castaldi | 250/227 X |
| 3,595,388 | 7/1971 | Castaldi | 209/80.5 |

*Primary Examiner*—Allen N. Knowles
*Attorney*—Paul D. Flehr, Harold C. Hohbach, Aldo J. Test et al.

[57] ABSTRACT

A system for sequentially reading the notched edge code on a microfiche carrier compensates for lateral misalignment of the carrier by the use of multiple banks of fiber optic code sensors. The appropriate bank is energized by use of additional sensors for a code guide formed on the carrier. A prescribed field of view also accommodates bowing of the carrier. Use of fiber optics reduces the need for complicated lenses.

8 Claims, 10 Drawing Figures

INVENTORS
GILBERT F. CLIFFORD
ROBERT W. HENKEL
DONALD F. SMITH
ARTHUR W. O'DELL
ROBERT W. WAY

BY Flehr, Hohbach, Test, Albritton and Herbert.

ATTORNEYS

INVENTORS
GILBERT F. CLIFFORD
ROBERT W. HENKEL
DONALD F. SMITH
ARTHUR W. O'DELL
ROBERT W. WAY

BY Fleke, Hohbach, Test, Albritton & Herbert
ATTORNEYS

INVENTORS
GILBERT F. CLIFFORD
ROBERT W. HENKEL
DONALD F. SMITH
ARTHUR W. O'DELL
ROBERT W. WAY

BY Flehr, Hohbach, Test, Albritton and Herbert
ATTORNEYS

INVENTORS
GILBERT F. CLIFFORD
ROBERT W. HENKEL
DONALD F. SMITH
ARTHUR W. O'DELL
ROBERT W. WAY

BY Flehr, Hohbach, Test, Albritton and Herbert
ATTORNEYS

INVENTORS
GILBERT F. CLIFFORD
ROBERT W. HENKEL
DONALD F. SMITH
ARTHUR W. O'DELL
ROBERT W. WAY
BY
Flehr, Hohbach, Test, Albritton and Herbert
ATTORNEYS

RANDOM DOCUMENT LOCATOR

BACKGROUND OF THE INVENTION

The present invention is directed to a random document locator and more specifically to apparatus for locating coded microfilm in a bin when the microfilm has been randomly stored. Sheets of microfilm are known as microfiche. In order to retrieve randomly stored microfiche, a multi-bit code carried by the microfiche must be sensed. Small misalignments of a film in its storage bin may cause an erroneous code reading and thus retrieval of a spurious microfiche. Since the microfiche are stored in slots along the sides of a bin, they can be laterally misaligned or bowed. Lateral tolerances are caused by variations of width of the microfiche carrier or frames, by the bin slots, and by associated bearings. Prior systems have met these problems by tight tolerances; this remedy is costly.

OBJECTS AND SUMMARY OF THE INVENTION

It is therefore a general object of the present invention to provide an improved random document locator.

It is a more specific object to provide a document locator which does not require tight system tolerances.

In accordance with the above objects there is provided a system for locating randomly stored data in the form of relatively rigid geometrically shaped sheets each carrying a unique identifying code, the sheets being in an elongated bin retained in similar relationship to each other. A carriage is mounted for moving along said bin and a head is mounted on the carriage for movement therewith for sequentially sensing the identifying codes of said sheets. The sensed codes are compared with a predetermined code to provide a compare indication. Retrieving means mounted on said carriage for movement therewith are responsive to the compare indication for retrieving the sheet carrying said predetermined code. The improvement of the invention comprising means for sensing the identifying codes, each of the identifying codes having a predetermined plurality of spaced bits. The sensing means includes a plurality of individual sensors in proximity to the bits at least double their number. The sensors are divided into at least two interdigitated groups. The identifying codes also including a guide bit, at least two of the sensors sensing the guide bit for indicating displacement of the sheet from a normal position. The guide sensors determine which one of the sensor groups is to sense an associated bit.

DETAILED DESCRIPTION OF THE PREFERRED EMBODIMENT

The microfiche locating system of the present invention is a portion of an overall system which is disclosed and claimed in a copending application entitled "Document and Information Storage and Retrieval System" Ser. No. 195,088, filed Nov. 3, 1971, and assigned to the present assignee. Such a system includes a multilevel storage cabinet where each level has a plurality of side by side elongated bins which hold edge-notched film or microfiche carriers. Each level includes scanning, retrieval, transportation, display and refiling systems for selectively filing and retrieving carriers carrying documentary or other information.

Figure 1:
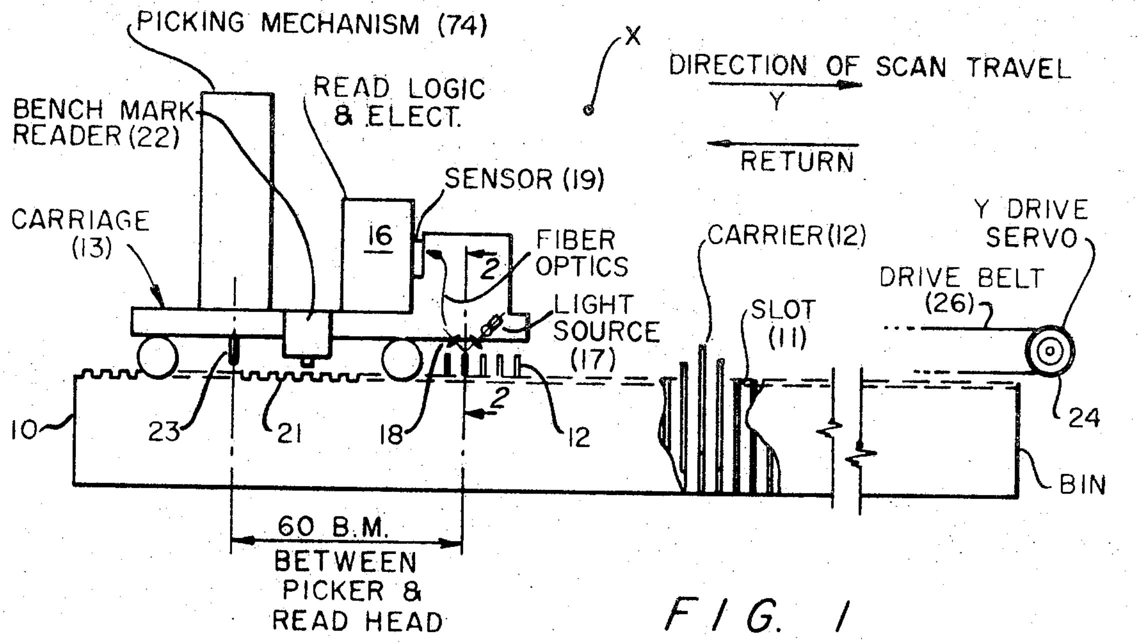
FIG. 1 is a simplified elevation view partially in section and partially cut away showing apparatus embodying the present invention.

FIG. 1 shows an elongated storage bin 10 having slots 11 into which microfiche carriers 12 are inserted. A carriage 13 is mounted for movement along the bin and includes mechanisms for both locating a carrier carrying a particular identifying code in the form of edge notches and a means of picking or retrieving the carrier 12 out of its slot and transporting it to some central viewing location. In addition, the same picking mechanism can restore carriers to a vacant slot.

Specifically, carrier 13 includes a picking and storing mechanism 14 and a reading unit 16 which is for the purpose of sensing the identifying codes on the carriers 12. Reading unit 16 includes a light source at 17 and a fiber optic reading head 18 consisting of a plurality of optical fibers which are aligned and in proximity to the carrier. The other ends of the fibers terminate at photosensors 19.

Bin 10 has along its edge, notches 21 which are termed in the art bench marks. Carriage 13 contains a bench mark reader 22 which measures the distance of movement of carriage 13. Each bench mark 21 is associated with a particular slot 11 and carrier 12. Picker 14 includes a retrieving mechanism 23 located over the carriers 12 which is located an integral number of bench marks, e.g., 60, away from the reading head 18.

Carriage 13 has a direction of scan travel, the Y-direction where the reading head 18 is sequentially sensing the identifying codes on the carriers. The other bins on one level are located in the indicated X-direction. Carriage 13 is moved in the Y-direction and returned by a Y-drive servo 24 which is coupled to carriage 13 by a drive belt 26.

Figure 2A:
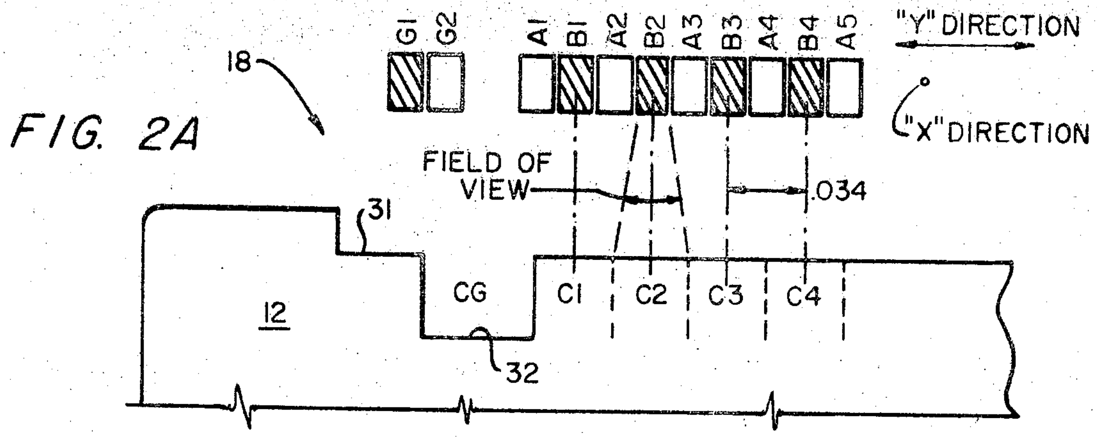
FIGS. 2A, 2B and 2C are simplified cross-sectional views taken substantially along the line 2—2 of FIG. 1.
Figure 2B:
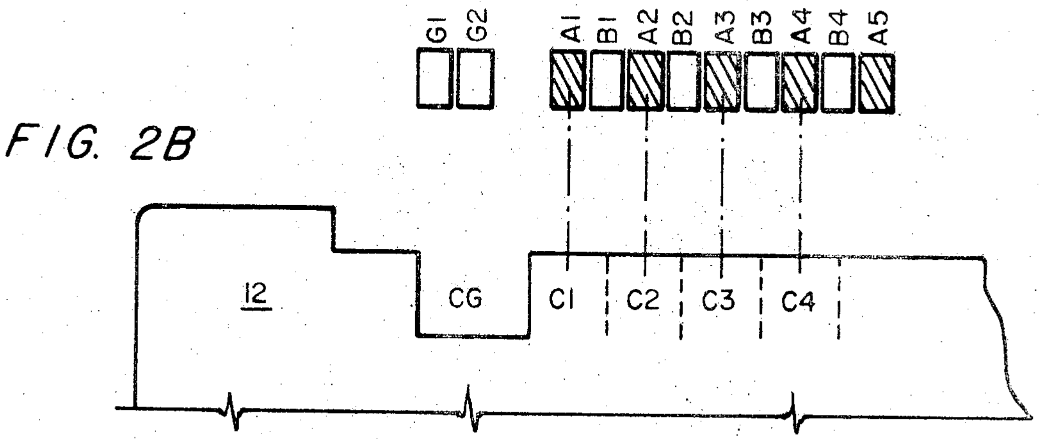
Figure 2C:
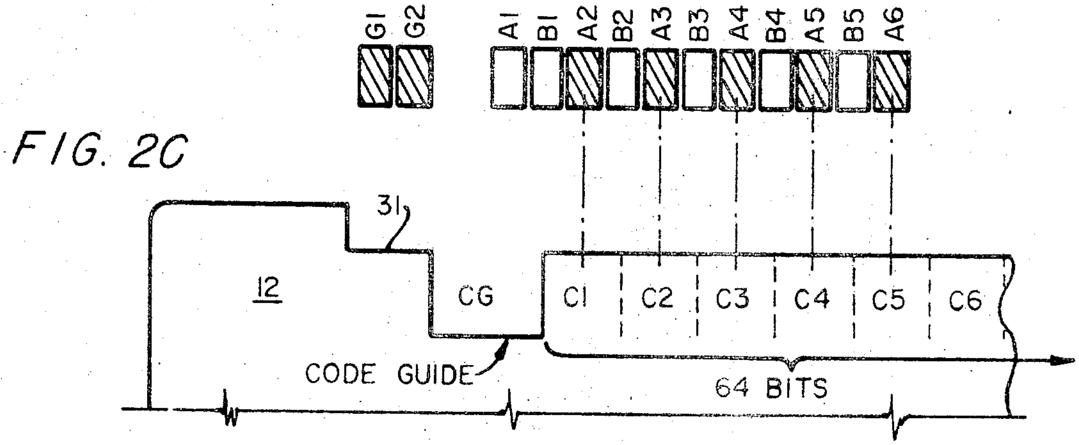

FIGS. 2A, 2B and 2C illustrate a portion of the reading head 18 and its relationship with a carrier 12 as it might appear in FIG. 2A in an optimum lateral position or in FIGS. 2B and 2C as laterally misaligned either to left most or right most position. As illustrated in FIG. 2A, the Y-scan direction is looking into the drawing.

Frame 12 has indicated on it code positions designated C1 through C4. In all there are 64 code positions or bits. They may either be high as illustrated or notched. As will be explained in conjunction with the electrical circuitry, a notched bit does not produce a sufficient light reflection to actuate the sensor associated with that bit. One of the bits, for example, this could be C4, is always in the state of being high for the purpose of providing a reflection reference standard. That is, the code edges of some carriers may be worn or faded so that relatively less light is reflected to the reading head 18. The entire threshold level of the electrical circuitry must be lowered to compensate for this fact. Three other bits are used for parity checking purposes leaving 60 data bits. In normal use, this 15 four-bit numeric digit can be encoded into the carrier 12 for retrieval purposes. At least this number of digits is desirable for attribute type searches.

Carrier 12 also includes a code guide (CG) having a reflective flat 31 and a non-reflective flat 32. The code guide indicates the lateral misalignment of the frame in the bin. Associated with the code guide are guide sensors G1, G2 which are part of the read head 18.

Read head 18 also includes individual fiber optic sensors A1 through A65 and B1 through B64, only representative of ones which are illustrated. Each sensor is substantially square in shape and is aligned in a single row in a direction parallel to the carrier edge and perpendicular to the Y-direction. The sensor, for example B2, has a field of view which is in the direction parallel to the alignment of the sensors and is substantially equal to the width of a code notch or code bit; typically this may be 0.034 inches. Moreover in the preferred embodiment, the interdigitated A and B groups of sensors also have a center to center spacing equal to one-half that of the bit width or 0.017 inches. This, in the preferred embodiment, there are substantially double the number of fiber optic sensors 18 compared to the code bits on the edge of carrier 12. Additional groups of fibers could be used for reading head 18 but the smaller width of the fibers makes this prohibitive from a cost standpoint. FIG. 2B illustrates a typical distance of the head 18 from the carrier edge as being 0.060 inches in order to achieve the field of view discussed above.

As discussed, FIGS. 2A, 2B and 2C illustrate three different positions of the carrier 12. In FIG. 2A the carrier is in an optimum or centered position. This condition is indicated by guide sensor G1 being activated as shown by the cross hatching and guide sensor G2 being in an unactivated state because of the lack of sufficient reflection from flat 32 of the code guide. With this condition, the logic unit senses the code guide sensors G1 and G2 and activates only the B-group or bank of sensors. Specifically, B1 through B64 are used with the A's being unused.

FIG. 2B illustrates the case where carrier 12 has been laterally misaligned to the left. Here neither guide sensor G1 nor G2 are activated. In this condition, sensors A1 through A64 are used with A65 and all of the B-group not being used. Lastly, in FIG. 2C carrier 12 is misaligned to the right, G1 and G2 are both activated by the reflection from surface 31 causing A2 through A65 to be used and A1 and all B's not used.

From the foregoing description of the lateral misalignment compensation it is apparent that the alignment of the carrier in its bin may vary by plus or minus 0.017 inches which is equal to the center to center spacing of the code sensors A and B. Misalignment positions intermediate to the three described may use either an A or B group as long as a permanent choice is made by the guide sensor. This is achieved by hysteresis in the logic circuitry.

Figure 3:
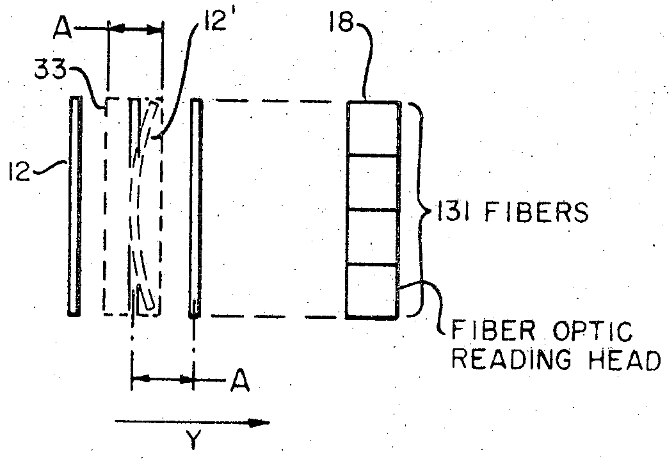
FIG. 3 is a diagrammatic view of a portion of FIG. 1 useful in understanding the invention.

As illustrated in FIG. 3 the carriers 12 are arranged in the bin in spaced parallel vertical relationship with a center to center spacing equal to A. In order to compensate for any bowing of carrier 12, as shown at 12', the reading head 18 ideally has a field of view in the scan or Y-direction the same as this center to center spacing. This is indicated by the dashed block 33. This accommodates sufficient bowing as illustrated at 12' but yet keeps the reading head from reading two adjacent carriers. The field of view in the Y-direction which is, of course, perpendicular to the aligned fibers of head 18 is in the preferred embodiment substantially 0.030 inches. Thus, it is substantially equal to the field of view of the reading head with respect to the individual code notches which is 0.034 inches.

Figure 4:
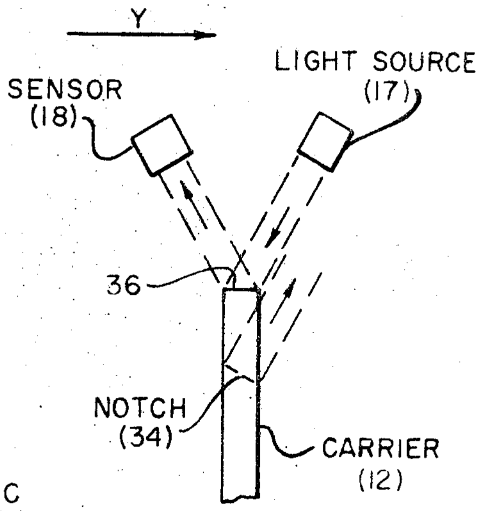
FIG. 4 is a side view of a portion of FIG. 3.

FIG. 4 illustrates a method which provides the greatest contrast in light reflection between an unnotched and notched carrier bit. Light source 17 is indicated as illuminating both a solid line 36 unnotched carrier on a carrier with a dashed line 34 indicating a notch. Sensor 18 receives reflected light from the unnotched surface 36 but receives none from notched surface 34 because of its slant at an angle which reflects light away from sensor 18. A U.S. Pat. issued to H. B. Thomas No. 3,515,886, dated June 2, 1970 shows in FIG. 4 a notched carrier with a slant. However, here the slant is in a direction opposite that of the present invention where a slight diffusion of light would cause a reflection back to the sensor. In fact, Thomson requires a lens to provide exact focusing of the beam. With the fiber optics of the present invention such need for a lens and critical focusing is obviated.

Figure 5:
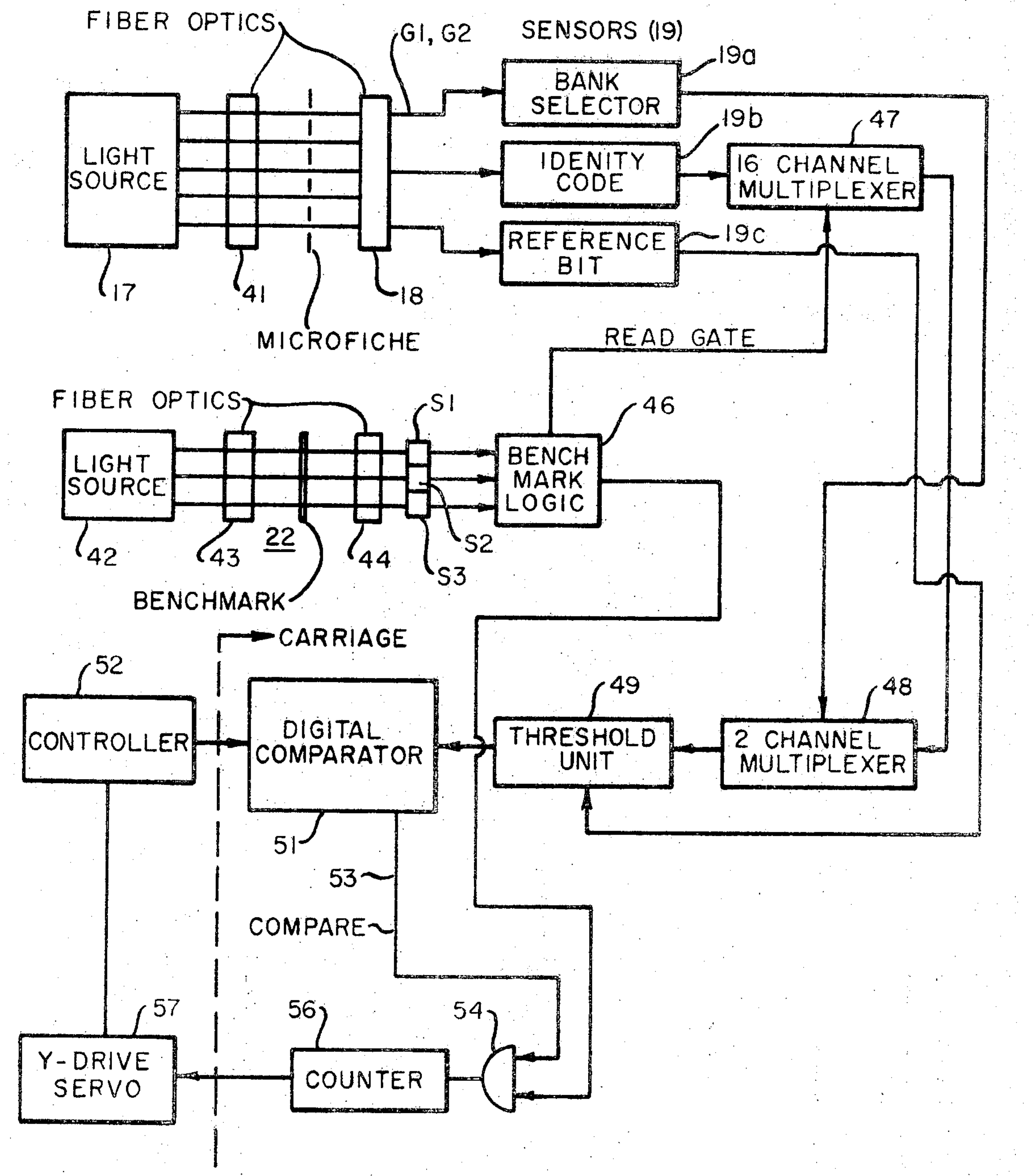
FIG. 5 is a block diagram which includes a portion of FIG. 1.

The overall functioning of the system is shown in simplified form in FIG. 5. The light source 17 is projected through fiber optics 41 onto a microfiche or specifically carrier 12 over which it is scanned. Reflections are picked up by fiber optic sensors 18 and coupled to photosensors 19. This includes bank selector sensors **19*a* which are coupled to fiber optic sensors G1, G2, indentity code sensors 19*b* which are coupled to fiber optic sensor groups A and B and reference bit sensors 19*c*** which in practice are coupled to any three adjacent identity code sensors.

The bench mark reader 22 includes a light source 42 coupled to the bench marks by fiber optics 43. Reflections are picked up by a fiber optic reading head 44 and coupled to photosensors designated S1, S2, S3 which have their electrical output in turn coupled to the bench mark logic unit 46. One of the outputs of the bench mark logic unit which activates a read gate, is coupled into a 16-channel multiplexer 47. As will be described in conjunction with FIG. 8 the identity code sensors **19*b* are multiplexed in groups of 16. The output of multiplexer 47 is coupled into a two-channel multiplexer 48 which is switched by the output of bank selector sensor 19*a*; in other words, this selects either the A or B groups of the fiber optic sensors. Multiplexer 48 is coupled to a threshold unit 49 which has as its reference input the output of reference bit sensor 19*c*. This differentiates between the reflective and non-reflective states of a bit or whether or not there is a notch in the carrier. The output of threshold unit 49 is digital and is coupled to a digital comparator 51.**

In an identity code has been selected by master controller 52 which compares with the code of the carrier now being read, a compare indication is produced on line 53. This line is coupled to AND gate 54 with an output from bench mark logic 46. The carriage is stopped a predetermined number of bench mark counts after the compare indication. This is accomplished by the counter 56 which is coupled to Y-drive servo motor 57.

Figure 6:
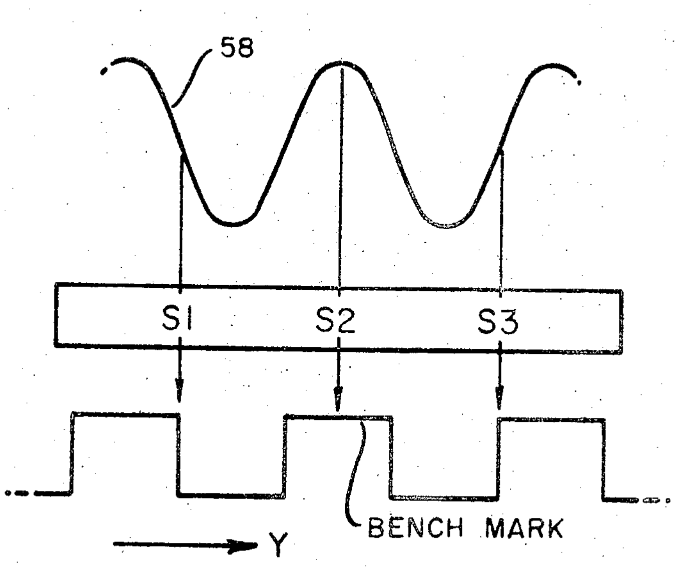
FIG. 6 is a space phase diagram useful in understanding the invention.

The bench mark photosensors S1, S2 and S3 are actually located in space phase as illustrated in FIG. 6 with relation to the bench marks. As illustrated by the waveform 58, S1 is 180° out of space phase with S3. S2 is 90° leading or lagging with the other two photosensors.

Figure 7:
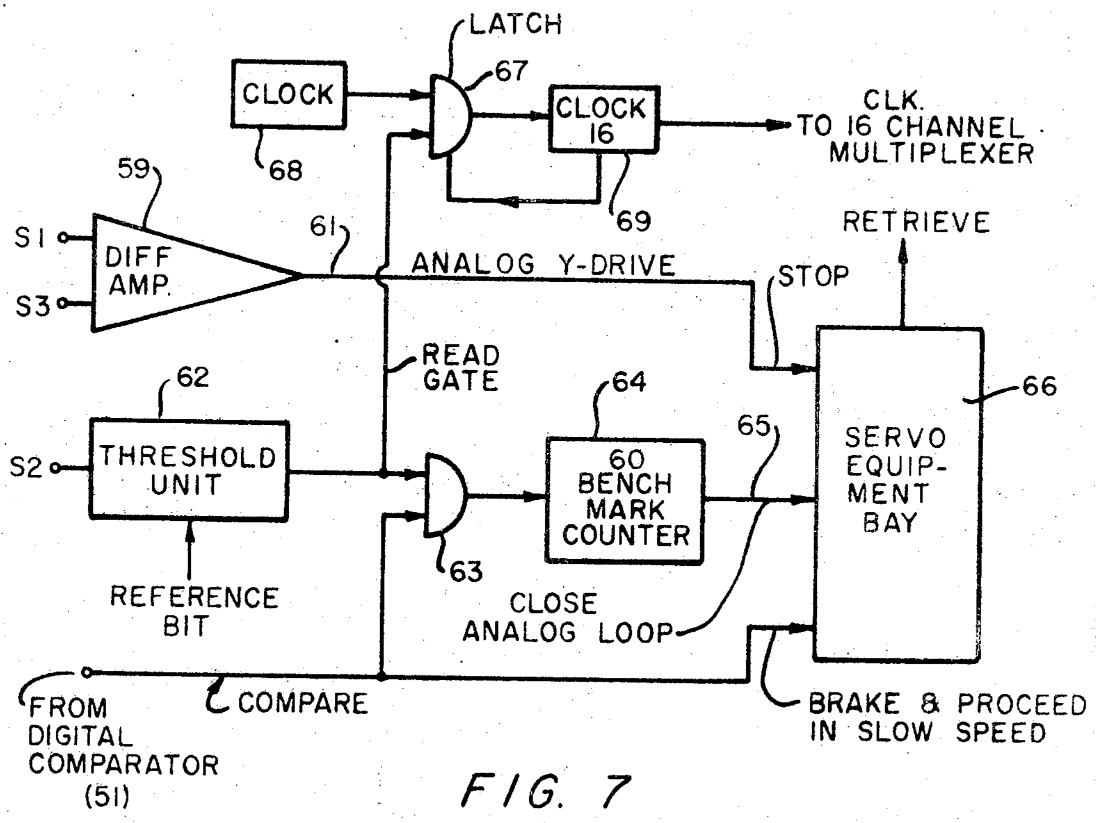
FIG. 7 is a detailed block diagram of a portion of FIG. 4.

The 180° space phase relationship of S1 and S3 is made use of in a differential amplifier 59 shown in FIG 7. An amplified output on line 61 is produced where the magnitude of the oscillating waveform is double that of the single waveforms S1 and S3. This is for the purpose of allowing the Y-drive servo to home in on the zero crossing of a large amplitude analog signal to provide an exact stopping point.

The S2 bench mark output is used merely for counting bench marks. This is coupled into a threshold unit which has a reference bit input from reference bit sensor 19*c*. The output of threshold unit is coupled into an AND gate 63 which has as a coincidence input the compare output from digital comparator 51. AND gate 63 is coupled to a counter 64 which when it counts 60 bench marks produces an output on line 65 which indicates to the servo equipment bay 66 that the analog loop is to be closed to the analog Y-drive line 61 to cause the Y-drive servo stop at the next zero crossing. However, previous to this indication the Compare line itself is coupled to the bay 66 to indicate to the Y-drive servo that it is to brake and proceed in slow speed until the loop is closed and it receives a stop indication on the analog Y-drive line 61.

The output of threshold unit 62 provides an effective read gate for the reading head by driving the 16-channel multiplexer 47 of FIG. 5. Specifically, the read gate output of unit 62 is coupled into a latch 67 which has as its second input a high speed multiplexer clock 68. The output of latch 67 is connected to a "clock 16" unit 69 which when it counts to 16 produces an output on the read gate line which is connected to 16-channel multiplexer 47. Thus, in operation, every scanned bench mark produces 16 pulses to multiplexer 47 to cause a reading of all of the identity code channels at this time. The timing in the circuit is such that, as illustrated in FIG. 3, the field of view 33 of the read head is in the centered position indicated.

The 60 counts of counter 64 are for the purpose of stopping retrieval mechanism at the top of the carrier. Actually, 60 counts is merely mechanically convenient and it could be any exact integral number. However, the following steps must be taken in the initail installation of the equipment to align it to the 60 bench mark count: First, the read head 18 is aligned to the top of a carrier. Secondly, the bench mark reader or sensor S2 is mechanically moved to produce a zero analog signal out. Thirdly, the picking mechanism is aligned to the top of a carrier 60 bench marks away from the read head.

Figure 8:
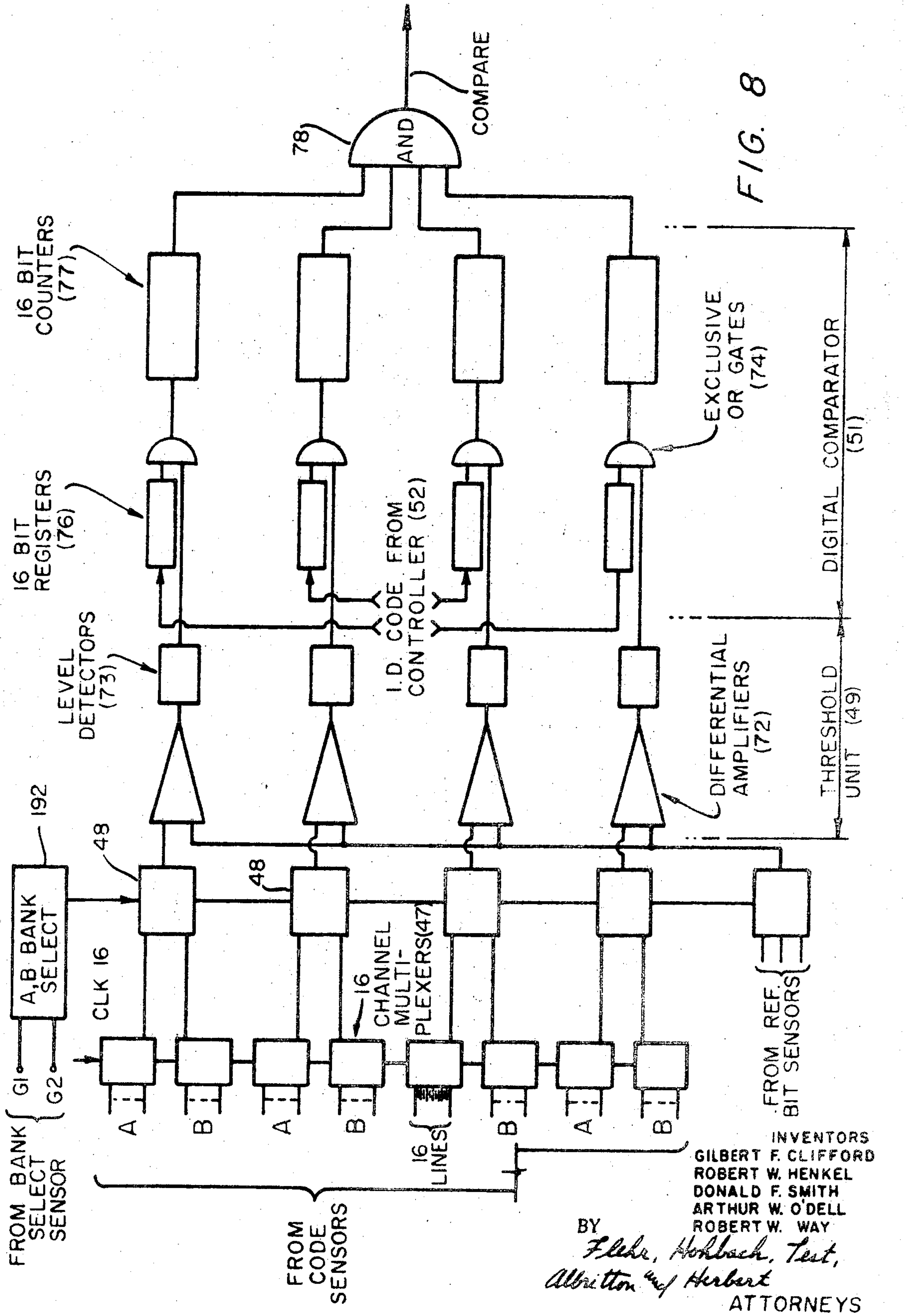
FIG. 8 is a detailed block diagram of another portion of FIG. 4.

FIG. 8 shows the read logic in greater detail where the multiplexers 47 are divided into eight 16-channel multiplexer units with the A and B group identity code sensors being alternated. The bank select mechanism 19*a* has been simplified indicating only an A, B select whereas in actuality A65 and A1 would also be separately switched in one instance. However, this is straightforward logic and is not shown for purposes of simplicity. The same is true of the bank select connection to a two-channel multiplexer 71 which receives the output of the reference bit sensors 19*c*. Since a sensor can be located over more than one bit, multiplexer 71 can recognize this from the bank select information where in the right extreme lateral displacement position G1 and G2 are both high and in the left extreme position G1 and G2 are both low.

Threshold unit 49 is actually composed of differential amplifiers 72 and level detectors 73. The differential amplifier 72 has as an input the reference bit from the multiplexer 71. Level detector 73 then provides a digital output into the exclusive OR gates 74 which are part of digital comparator 51. The other inputs to the OR gate 74 are 16-bit registers 76 which are filled from controller 52 when it selects a specific identity code. Since the code is 64 bits, it is split up in four parts each being contained in one of the 16-bit registers. A coincidence condition between the bits stored in registers 76 and those produced from level detectors 73 produces a count in the 16-bit counters 77 and when a full count is reached by all four counters, a coincidence compare indication is given by AND gate 78.

Thus, the present invention provides an improved random document locator which compensates for large lateral misalignments of a microfiche carrier. In addition, the bowing is also accommodated by use of prescribed field of view. Complexities in the system are reduced by use of fiber optics. Errors are also reduced by angled code notches to provide greater contrast between the reflective and non-reflective binary states.

We claim:

1. A system for locating randomly stored data in the form of relatively rigid geometrically shaped sheets each carrying a unique identifying code said sheets being retained in an elongated bin in similar relationship to each other; a carriage mounted for moving along said bin; a head mounted on said carriage for movement therewith for sequentially sensing said identifying codes of said sheets; means for comparing said sensed codes with a predetermined code and for providing a compare indication; retrieving means mounted on said carriage for movement therewith and responsive to said compare indication for retrieving said sheet carrying said predetermined code the improvement comprising means for sensing said identifying codes, each of said identifying codes having a predetermined plurality of spaced bits, said sensing means including a plurality of individual sensors in proximity to said bits at least double the number of said bits, said sensors being divided into at least two interdigitated groups said identifying codes also including a guide bit, at least two of said sensors sensing said guide bit for indicating displacement of said sheet from a normal position, said guide sensors determining which one of said sensor groups it to sense an associated bit.

2. A system as in claim 1 where said bits are formed by notches in an edge of said sheets, the presence of a notch indicating one state and the absence a second state, said sensing means including a light source directed at said notched edges, said sensors sensing the level of reflected light, the bottom edge of said notches being slanted at an angle to reflect light from said source in a direction away from the associated sensor.

3. A system as in claim 1 where said bits are formed by notches in an edge of said sheets, the presence of a notch indicating one state and the absence a second state, said sensing means including a light source directed at said notches edges, said sensors sensing the level of reflected light, together with reference means including a predetermined unnotched bit for setting a reference level of reflected light for each sheet scanned.

4. A system as in claim 1 where said bin carries bench marks physically associated with each stored sheet and together with means for counting said bench marks for stopping said retrieving means in proximity to a sheet carrying said predetermined code a fixed number of counts after said compare indication said means for counting including two photosensors and a differential amplifier having as inputs the outputs of said photosensors.

5. A system as in claim 1 where said sheets are stored in spaced parallel vertical relationship in slots in said bin and where said sensors are aligned and have a field of view perpendicular to said alignment substantially equal to the center to center spacing of said sheets.

6. A system as in claim 5 where said bits are formed by notches in an edge of said sheets, the presence of a notch indicating one state and the absence a second state, said sensing means including a light source directed at said notched edges, said sensors sensing the level of reflected light, and where said field of view of said individual sensors in a direction parallel to said alignment is substantially equal to the width of a notch such field of view being substantially equal to said field of view in said aligned direction.

7. A system as in claim 1 where said bits are formed by notches in an edge of said sheets, the presence of a notch indicating one state and the absence a second state, said sensing means including a light source directed to said notched edges, said sensors sensing the level of reflected light, and where said field of view of said individual sensors parallel to said edges is substantially equal to the width of a notch.

8. A system as in claim 1 where said sensors include a fiber optic reading head in proximity to said sheets.

* * * * *

PO-1050
(5/69)

UNITED STATES PATENT OFFICE
CERTIFICATE OF CORRECTION

Patent No. 3,738,487 Dated June 12, 1973

Inventor(s) Robert W. Way, Gilbert F. Clifford, Robert W. Henkel, Arthur W. Odell, Donald F. Smith It is certified that error appears in the above-identified patent and that said Letters Patent are hereby corrected as shown below:

The address of Arthur W. Odell should be changed from "Alberton" to --Atherton--. In the drawing, Sheet 5, Figure 8, the reference numeral "192" should be changed to --19a--; the reference numeral --71-- should be applied to the box adjacent the legend "From Ref. Bit Sensors". Column 2, line 17, --sheet like-- should be inserted after "which". Column 2, line 21, --sheet or-- should be inserted after "the". Column 2, line 25, "carrier" should be changed to --carriage--. Column 2, line 54, "Frame" should be changed to --Carrier--. Column 4, line 11, "on" should be changed to --and--. Column 4, line 56, "In" should be changed to --If--. Claim 3, line 4, "notches" should be changed to --notched--

Signed and sealed this 23rd day of April 1974.

(SEAL)
Attest:

EDWARD M.FLETCHER,JR.
Attesting Officer

C. MARSHALL DANN
Commissioner of Patents